June 10, 1958  S. H. KNEITEL  2,837,962
APPARATUS FOR PRODUCING ANIMATED
CARTOONS IN THREE DIMENSIONS
Filed July 10, 1953
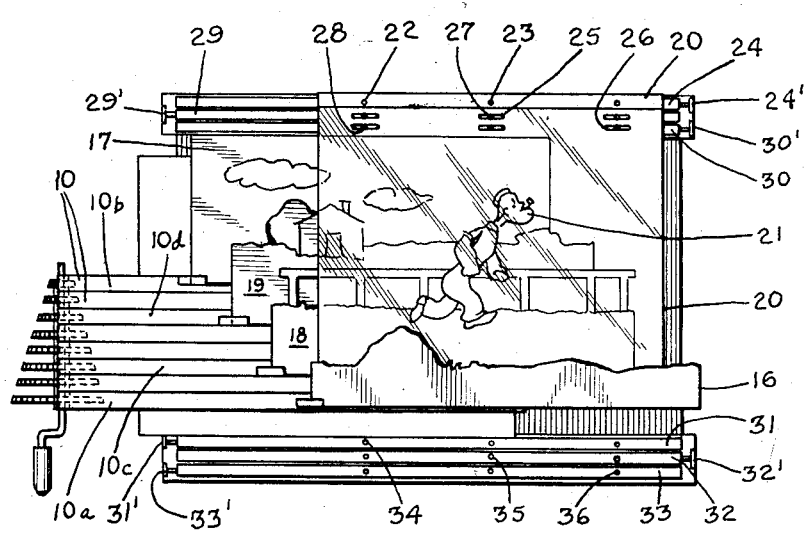
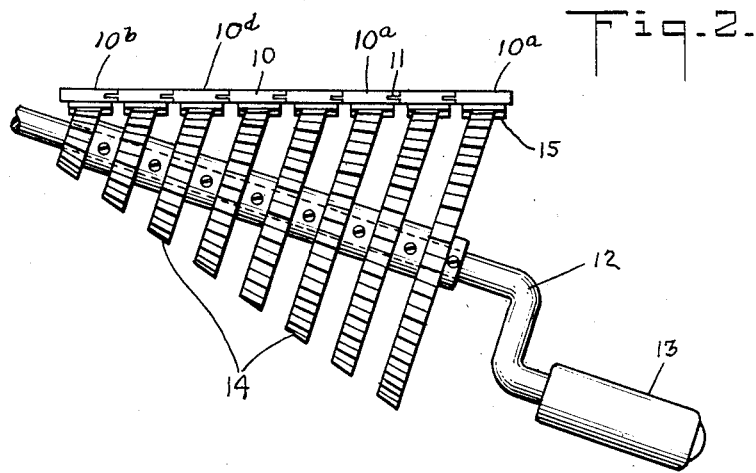
INVENTOR
SEYMOUR KNEITEL
BY
ATTORNEY

United States Patent Office 2,837,962
Patented June 10, 1958

2,837,962

APPARATUS FOR PRODUCING ANIMATED CARTOONS IN THREE DIMENSIONS

Seymour H. Kneitel, New York, N. Y., assignor to Paramount Pictures Corporation, New York, N. Y., a corporation of New York Application July 10, 1953, Serial No. 367,319

1 Claim. (Cl. 88—16)

This invention relates to the production of what are generally known as animated cartoons. More particularly, the invention deals with the provision of means whereby the scenery, as well as the characters acting within the scenery, can be adjusted into positions in the taking of left and right eyed pictures so as to produce, in the viewing of a moving picture of an animated cartoon, and by viewing through Polaroid glasses, a three-dimensional effect in the presentation.

Still more particularly, the invention deals with apparatus, wherein illusions of an object moving in the direction of an audience can be obtained in the photography of subjects of this type and kind.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a diagrammatic view illustrating a plurality of scene sheets and a Celluloid character sheet and indicating the means for adjusting the arrangement of these sheets one with respect to the other in photographing the same to produce three-dimensional effects; and Fig. 2 is a detailed view diagrammatically showing the method of relatively adjusting the scene sheets one with the respect to the other.

In illustrating one adaptation and use of my invention, I have diagrammatically shown, in Fig. 1 of the drawing, arrangement of mechanism on the camera bed of a standard camera utilized in taking animated cartoons and suitably disposed upon the bed are a series of strips or slides 10 which preferably have tongue and groove engagement with each other, as indicated at 11 in Fig. 2 of the drawing. At one end of the camera bed is angularly mounted a shaft 12 arranged in suitable bearings, the shaft having an operating crank 13 at one end. Fixed along the shaft 12 are a plurality of gears 14 which engage suitable racks 15 on the lower surfaces of the slides 10, the gears 14 being of different size so that, in rotation of the shaft 12, the foremost slides or slides to which foreground scene sheets are attached will move a greater distance than sheets which are attached to the rearmost strips, the latter sheets being backgrounds of a scene.

For example, in the drawing, I have diagrammatically shown a foreground sheet 16 which is fixed to one of the front slides, as for example, the slide 10a. At 17 I have shown a background sheet representing the sky and this sheet can be fixed, for example, to the slide 10b; whereas, at 18 and 19, I have shown two intervening scenery sheets, for example, the fence sheet 18 and the house and land sheet 19, the two latter sheets being fixed respectively to the slides 10c and 10d. It will thus be seen that, in rotation of the shaft 10 in either direction, the foreground sheet 16 will be moved a greater distance than the sheet 18; 18 will move a greater distance than the sheet 19 and 19 will move a greater distance than the sheet 17. In this manner, in the photographing of this scenery, in taking the left and right eyed pictures, as later described, a true perspective and depth conception will prevail in the viewing of the moving picture of the animated cartoon through or by the use of Polaroid lenses.

In addition to the scenery of a picture being photographed, one or more character cells or sheets can be moved relatively to the scenery and to each other and, to illustrate the simplest form of this procedure, I have shown at 20 in Fig. 1 a Celluloid or, in other words, transparent sheet having a character printed, painted or otherwise applied thereto, as indicated at 21. One edge portion of this sheet, the upper edge in the construction shown, has a series of apertures 22 to engage pins 23 on a parallax adjustment bar 24.

Adjacent the apertures 22 are two pairs of elongated apertures 25 and 26, which receive two sets of three pins, a set 27, a set 28, the pins 27 and 28 being similar to the pins 23 and are disposed upon bars 29 and 30, respectively. The ends of the bars 24, 29 and 30 have adjustment knobs 24', 29' and 30' respectively to control shifting of a number of sheets, similar to the sheet 20, one with respect to the other. The two other sheets, which would be mounted on the pins 27 and 28, are not shown for the purpose of simplifying the present illustration. These other sheets are utilized as and when other characters or objects moving relatively to the scene are employed. However, in many instances, a single character, such as the character 21, appears on a scene during the process of photography.

As with animated cartoons as now produced and well known in the art, substitute sheets, similar to the sheet 20, are inserted in position from time to time to give motion to the character 21 being photographed, but no detailed reference will be made to this well known procedure. It might be mentioned here, however, that this motion will take place without any change in the positioning of the sheets 17, 18 and 19 for all left eyed pictures and the same being the case for all of the right eyed pictures. As and when the scenery changes or moves relatively to the character 21, substitute sheets are provided for the sheets 17, 18 and 19 to introduce, in the photography thereof, the shifting or motion to the scene.

In Fig. 1 of the drawing, the bars or rails 24, 29 and 30 are disposed at the upper edge of and constituting part of the camera bed or in reality would be the rear edge of the camera bed. However, at 31, 32 and 33 are shown another series of bars or rails, similar to the bars or rails 24, 29 and 30 for adjustment of each characterized transparency, the latter being utilized as and when a great number of characters appear in a scene and are movable relatively to each other. The latter bars have adjustment knobs 31', 32' and 33' to control adjustment thereof, as with the first mentioned bars. The bars also have the series of pegs thereon, as indicated at 34, 35 and 36. The bars or rails 31, 32, 33 also constitute part of the camera bed.

It will be apparent that the elongated apertures are provided in the sheet 20 so as to provide movement of this sheet relatively to the pegs 27 and 28; whereas a sheet mounted on the pegs 27 will have apertures, similar to the apertures 26, to clear the pegs 28; whereas a still further sheet would have apertures simply to receive the pegs 28, these sheets being disposed one above the other in the order named. The same method of procedure would be followed in mounting sheets upon the pegs 34, 35 and 36 of the bars 31, 32 and 33.

It will be understood that with my process I require only the same amount of drawings and Celluloids which are required in the taking of normal animated cartoon pictures of the two dimensional type. In the taking of these pictures, a single camera is used and all of the pictures for one eye are taken of a complete scene, after which, the parallax of the scene is altered and the pictures for the other eye are taken of the complete scene.

I have also found that it is desirable in taking the three dimensional pictures to avoid utilizing drawings that have extreme perspective depth. I have also found it desirable to use, in scenes of the kind under consideration, foregrounds which are in a solid color, preferably without characterizations or markings.

In any three dimentional picture, there are four vital requirements that are necessary to create the illusion of depth. One requirement is perspective, the second requirement is light and shade, the third requirement is color and the fourth is parallax. The first three requirements are necessary to give the impression of depth even to the ordinary two dimensional picture. In three dimensional pictures, parallax is the element which transforms a perfectly flat subject into what appears to be a window through which the observer receives the sensation of seeing actual depth; a depth that has no bounds on either side of the screen on which the picture of the subject is projected.

In the parallax adjustment of the subject in taking the left and right eyed pictures, it is important that the parallax adjustments be made parallel to the top and bottom of the photographic field of action. If this is not done, distortions would prevail which might create eye discomfort.

As the parallax spread of an object increases going from a zero position, that is to say, the position where both eyes meet at a common point, into the perspective of the picture, the impression of depth also increases. On the other hand, as the parallax spread of an object decreases going from the depth of the picture toward the zero position, it appears that the object is approaching the observer. By approaching the observer, I mean that an object can give the impression of leaving the screen and approaching the audience.

In the diagrammatic showing of Fig. 1, the various scenery sheets 16, 17, 18 and 19 are shown in a stepped relationship to each other, simply to clearly illustrate the different sheets. Normally in the taking of pictures, these sheets will be superimposed one directly upon the other with edge portions of the sheets in common alinement. This is also true of the characterized transparency or Celluloid 20.

This arrangement would be the normal assemblage of the sheets. In the taking of pictures, the operator follows an instruction chart in the taking of each of the left and right eyed parallax pictures. The member 12 is first adjusted, for example, for taking the left eyed pictures. This adjustment will put the scenery sheets in the proper relationship one with respect to the other. The sheet 20 is then also adjusted for proper positioning of the character with respect to the scenery. Then a series of successive pictures are taken of the scenery sheets, during which substitute sheets for the sheet 20 have been added to give motion to, and change of position of, the character 21.

After this has been done, the member 12 is again adjusted to bring the scenery sheets into the right eyed parallax position, after which the initial sheet 20 of the first series is placed in its proper parallax position which would be for the taking of the right eyed pictures and the successive character sheets having the character 21 thereon transmitting motion and movement would be again placed in position in taking the successive right eyed pictures. This same procedure is followed in the taking of all scenes and, as and when substitute scene sheets are employed to impart movement to one scene, the latter actually amounting to a new scene in the sense that new characterizations have been applied or utilized in different positions with some additional scenery added. This latter procedure is followed in the present known practice of taking the standard two dimensional pictures.

Having fully described my invention, what I claim as new and desire to secure by Letters Patent is:

In three dimensional photography of animated cartoons, a plurality of slides for adjustably supporting a corresponding series of scenery sheets, a single actuated member directly engaging said slides for moving the slides and sheets into different variable parallax positions in taking series of left and right eyed pictures of the scene characterized by said sheets, a characterized Celluloid arranged over and movable relatively to said sheets, means for adjusting the position of said Celluloid with respect to the scenery sheets, and said last named means comprising a plurality of manually adjustable pegged bars.

References Cited in the file of this patent
UNITED STATES PATENTS

| | | |
|---|---|---|
| 703,763 | Carter | July 1, 1902 |
| 1,669,407 | Artigue | May 15, 1928 |
| 2,057,051 | Owens | Oct. 13, 1936 |
| 2,123,529 | Goosson | July 12, 1938 |
| 2,152,921 | Robinette | Apr. 4, 1939 |
| 2,198,006 | Garity | Apr. 23, 1940 |
| 2,210,333 | Kroner | Aug. 6, 1940 |
| 2,522,662 | Brier et al. | Sept. 19, 1950 |
| 2,587,585 | Ayres | Mar. 4, 1952 |